United States Patent [19]
Denney

[11] 3,771,961
[45] Nov. 13, 1973

[54] CALCIUM ASSAY AND REAGENTS THEREFOR
[75] Inventor: Jerry W. Denney, Carmel, Ind.
[73] Assignee: American Monitor Corporation, Indianapolis, Ind.
[22] Filed: May 24, 1971
[21] Appl. No.: 146,536

[52] U.S. Cl. .............................................. 23/230 B
[51] Int. Cl. ......................................... G01n 33/16
[58] Field of Search ................................. 23/230 B

[56] References Cited
UNITED STATES PATENTS
3,547,586  12/1970  Denney et al. .................... 23/230 B OTHER PUBLICATIONS
R. J. Henry, Clinical Chemistry Principles and Technics, 1964, Harper & Row, Publ. Pages 358–360.

Primary Examiner—Morris O. Wolk
Assistant Examiner—R. M. Reese
Attorney—Robert A. Spray

[57] ABSTRACT

A colorimetric or fluorometric assay or process for determining the calcium level in blood serum in which the phosphorus present in the serum is caused to react with molybdate, especially in the presence of polyvinylpyrrolidone, in acid solution, prior to the addition of the dye, thereby eliminating phosphorous interference in the calcium determination.

8 Claims, No Drawings

CALCIUM ASSAY AND REAGENTS THEREFOR

Introductory Comments as to the Nature and Significance of Calcium in Blood Serum This invention relates to a process of analyzing blood serum as to its calcium content or level; and thus introductorily it seems desirable to mention, at least in brief or general terms and in perhaps an over-simplified manner, certain generally-accepted views as to the vital and unique significance of calcium in the body, and to illustrate the tremendous diagnostic need for the reliable measurement of the body's calcium content.

As is well known, the element calcium is a vitally important ingredient of blood serum, existing in free ionic form or in association with protein and organic acids.

Recognized roles of calcium in blood serum include several vital functions. Calcium seems to perform a regulating function in the excitability responsiveness of nerves and muscle tissue, and it has a vital function in a variety of other life processes. Its presence seems also necessary for contraction of muscles, and the beating of the heart. It is also necessary for coagulation or clotting of blood, and it is a major constituent of the teeth.

Much of the body's calcium is found in the bones, which act as a reservoir for certain materials such as calcium which are needed and used elsewhere in the body; and when for some reason the calcium in the blood serum drops below a certain level, the blood takes some of the calcium from the bones. An important life-process is this 'feed-back' process, that is, control of the balance of calcium in the bones, blood, and muscles; and any of several abnormalities or diseases may cause changes in the calcium content of the blood serum.

Thus an accurate and sometimes periodically repeated measurement of calcium in blood serum is particularly useful in diagnosing a variety of diseases, as well as in determining and analyzing the body's response to therapeutic measures; for, depending upon the condition or disease, either too-high or too-low calcium levels, and changes in the calcium level, will be indicative of facts very significant in the medical diagnosis.

For example, in hyperparathyroidism (an endocrine disorder due to excessive secretion of parathyroid hormone), elevation of serum calcium (hypercalcemia) is a most significant diagnostic observation. The condition has quite an adverse bodily effect; for example, the high calcium level in the blood serum causes weakness and other ill effects, the removal of calcium from the bones may lead to a general demineralization thereof and bone cysts or tumors, and the excessive excretion of calcium in the urine leads to the formation of kidney stones or even calcification of the kidney itself.

A contrasting condition, hypoparathyroidism, is due to an inadequate parathyroid secretion, and results in a lowering of blood calcium (hypocalcemia); and it causes irritability, muscle spasms, and other effects of the low serum calcium. Lowered levels of serum calcium are also associated with Cushing's syndrome, an adrenal hormone imbalance.

Calcium levels in blood serum are elvated in sarcoidosis, certain forms of cancer, hyperthyroidism, and hypoadrenalism.

A very severe condition causing sudden death of infants is idiopathic hypercalcemia; and it is characterized by elevated serum calcium as the most salient although morbid phenomenon.

Another illustrative instance of highly significant calcium level measurement is that associated with the avoidance of damage as to the kidneys after overdosage of Vitamin D has caused excessive absorption of calcium from the intestinal tract into the blood, as may have occurred in treating rickets.

These illustrate the diagnostic need and usefulness in diagnosing and treating bodily disorders and diseases; for the calcium level is an important one of the diagnostic evaluations, as to these and other bodily conditions. Moreover, the calcium level measurement if not merely needed as of a certain single time, for in certain treatments the change of calcium level is important to know. Thus, the accuracy is needed not only as that of a certain reading; the accuracy must be close enough to reliably detect changes and direction of change in calcium level, even though there are also other substances in the serum which not only tend to mask the calcium determination but which may themselves vary from time to time.

Assaying for Calcium; and Disadvantages of Prior Methods Including Those Using Dyes The classic method for assaying calcium in serum is that of Clark and Collip,[1] in which calcium is precipitated as an oxalate and subsequently assayed by colorimetric means. Oxalate was first used to assay calcium by Pribram as long ago as 1871,[2] and the Clark-Collip method was in wide use in the clinical laboratory until recent years. However, this method is no longer the most commonly used assay method for calcium in the clinical laboratory because of the required centrifugation, the careful and demanding technique which is required to prevent contamination with calcium from glassware, and the ease with which calcium may be lost due to loss of precipitate. Each of these factors impairs or may impair the assay reliability.

Atomic absorption spectroscopy has proved to be an adequate technique; but it requires special equipment which is costly and which is not present in most clinical laboratories.

Recently, several procedures have been proposed which depend on the ability of calcium to affect in some way the color of a dye.[3] These include methods using sodium chloranilate, cresolphthalein complexone, Eriochrome Blue SE, glyoxal bis(2-hydroxyanil) and alizarin. Calcein has also been used and its fluorescence measured.

Of these, the method using sodium chloranilate is at this time in wide use. However, the chloranilate method requires both precipitation of calcium (as calcium chloranilate) and centrifugation, prior to analysis. Since a process or assay requiring centrifugation and multiple procedural steps is not desirable in a clinical laboratory, due both to increased labor and the possibility of contamination with extraneous calcium, it is desirable to have available a procedure which can be performed directly on serum.

Certain of the methods of calcium assay which are dependent upon the ability of calcium to produce a color or fluorescence in or of a dye can be performed directly on serum but have shown erratic results.

Interferences occur which render colorimetric or fluorometric assaying for calcium difficult, due to the fact that certain other materials in the serum produce a masking effect or cause a reduction in the calcium which enters into the assay reaction. More particularly, interferences have been related to both the fact that magnesium also may produce color or fluorescence in the dyes under certain circumstances, and the fact that phosphorus in serum may complex calcium, making it unavailable to the dye. Both magnesium and phosphorus are usually present in serum, in varying amounts.

The detrimental masking effect of magnesium has been successfully eliminated in certain of these methods; however, the color-minimizing or interference effect of phosphorus has not been eliminated in those methods. And, obviously, if phosphorus has had the effect of reducing the amount of calcium available to produce the reaction observed as indicative of calcium level by the assay, the interpretation of the assay will be in error.

While phosphorus interference does not manifest itself in the classic Clark-Collip method, investigators have been aware of the potential problems since at least the early 1920's. Kramer, in 1921, evaluated his method (of which the Clark-Collip methods in a modification) in the presence of high levels of phosphorus.[4] There has been a continuing awareness of the problem, as Gradwohl, speaking of serum calcium, states in his text in 1942 "phosphates form insoluble calcium salts."[5]

Several attempts have been made to eliminate the effect of phosphorus in dye binding methods. Kenny used EDTA to titrate calcium in a dye binding method in 1954,[6] and was able to eliminate the effect. This, however, produced a titration method which is less desirable in a routine clinical laboratory than a direct color test or a direct fluorometric test.

Connerty in 1965[7] treated problem sera with acid for one hour before assay. However, this only partially solves the problem, for not only do the complexes reform in the subsequent alkaline step, but the method is of course time-consuming.

Burr in late 1969[8] was able to minimize the phosphorus problem by reducing the amount of serum used, thus causing low levels of calcium phosphate to go into solution. This approach, while being perhaps the best prior to the present invention, requires that a lowered sensitivity be accepted, and is not totally effective in solving the problem.

Prior to the present invention, accordingly, the problem still remained; that is, a dependable and convenient assay was needed which would achieve a sufficiently accurate determination of calcium level in blood serum, particularly avoiding the error-producing phosphorus interference, and, desirably, as assay which could be performed with equipment readily available to most hospital laboratories.

THE PRESENT INVENTION

It has been found that in a calcium assay process, a convenient preliminary step avoids the phosphorus interference, very effectively. That added step is a preliminary step in which the phosphorus is caused to react with molybdate in an acidic solution, especially in the presence of polyvinylpyrrolidone, prior to addition of alkaline dye solution. This eliminates subsequent interference of phosphate in calcium assays involving dye binding; and not only does it eliminate the phosphorus interference, it achieves this advantage without particularly complicating the test; and it avoids the necessity of the use of only small amounts of serum. The polyvinylpyrrolidone hastens the formation of the molybdophosphate complex.

Looking back on this discovery, and to the prior art prior to this long-sought invention of an improved and reliable calcium assay, it may seem surprising that prior experts have failed to discover this very advantageous step, even though it is a step which is quite a departure from the prior calcium assays. After all, recalling now the prior art, the reaction of molybdate with phosphorus under acid conditions has been known to analytical chemists since at least 1887.[9] A phosphorus assay method using the molybdate reaction by Fiske and Subbarow in 1925[10] has been in wide use since that time.

Moreover, in looking back on the present discovery, and recalling the state of the art prior to this discovery, it is noted that it is quite common in the clinical laboratory to perform separate assays of calcium and phosphorus in even the same specimen, since both are significantly involved in bone physiology and pathology, However, although the two assays are performed on the same blood sample, and usually even by the same chemist or technician, one of the apparent factors of unobviousness of the present discovery is that the calcium and phosphorus assays are performed by two separate assay procedures.

Moreover, as mentioned in the previous section, analytical chemists have been mindful of the problem of phosphate interference in calcium analysis; and they have long known of the great need for accurate calcium assays, and they have also been aware for years of the reaction of molybdate with phosphorus. But perhaps another reason for the unobviousness of using molybdate in calcium assays, and in fact its avoidance, has been a knowledge that the reaction of molybdate with phosphorus as used in the clinical laboratory yields a color which would be expected to interfere in the color reaction for calcium. A molybdate phosphate reaction would thus likely be assumed to be bad rather than good, in a calcium assay. (Polyvinylpyrrolidone has been used in reacting molybdate with phosphorus;[11] however, there, the concentration of molybdate used in association with the polyvinylpyrrolidone was so high as to be unworkable in the present invention, for it would interfere with the formation of the colored or fluorescent calcium-dye complex).

But in the assay according to the present invention, the expected molybdate phosphate reaction color is made to be not a problem; and thus the desired elimination of the phosphorus effect is achieved without introducing another masking effect.

Assay Procedure and Reagents According to the Present Invention

Embodiment I:
 A. Reagents
  Molybdic Acid Reagent:
   45 mg sodium molybdate,
   3 gm polyvinylpyrrolidone; dissolved in 100 ml of 0.2N $H_2SO_4$
  Dye Reagent:
   50 mg Glyoxal-bix-(2-hydroxyanil),
   Di-(2-hydroxyphenylimino)-ethane, dissolve in 100 ml of AR methanol
  Sodium Hydroxide:
   0.2N
 B. Procedural Steps:
  It will be assumed that the user will have test tubes, one marked "blank" and the other(s) marked "test".

To the test tube(s) and the blank tube add 1 ml of Molybdic Acid Reagent. Add 0.05 ml of each serum or standard to a test tube. Mix well. Allow to stand one minute. Add 2 ml of Dye Reagent and 2 ml of Sodium Hydroxide to all tubes. Mix. Determine the absorbence of the test(s) at 550 mu against the blank tube. The absorbence of unknown serums is proportional to the absorbence of standards. The calcium value of the serum is obtained by comparing the resulting optical density with a calibration curve prepared by performing aqueous solutions of calcium of known value by the same method.

Embodiment II:

A. Reagents:
Molybdate Reagent:
  18 mg sodium molybdate,
  3 gm polyvinylpyrrolidone; dissolved in 100 ml 0.2 N $H_2SO_4$.
Water:
  A good grade of deionized or distilled water.
KOH, 0.9N:
  Dissolve 44.8 g of reagent-grade KOH (assuming the KOH to be pure) and dilute to one liter with deionized water. Store in polyethylene.
Stock Reagent Solution:
  Prepare a stock solution containing 1.00 mg/ml of calcein or Fluorescein Complexone in 0.9 N KOH. Store in polyethylene. Stable for at least one month at 4°C in the dark.
Working Reagent Solution:
  Dilute 7.0 ml of the stock reagent solution to one liter with 0.9 N KOH. Store in polyethylene. Stable for one week at room temperature.

B. Equipment
The Turner Model 110 or Model 111 Fluorometer is fitted with the following items:
  Lamp: No. 110-850 (standard) or No. 110-851 (far UV)
  Filters:
    Primary No. 110-816 (2A) + No. 110-813 (47B)
    Secondary No. 110-818 (2A-12) + requisite neutral filters (see Sensitivity Adjustment)
  Cuvettes: 12 × 75 mm clear, plastic (polystyrene), disposable culture tubes with cap. Tubes which are supplied individually wrapped are preferred.

C. Sample:
Serum or heparinized plasma.

D. Procedure:
1. Pipette 1 ml Molybdate reagent into each tube. Add 0.02 ml serum to each test. Allow to stand for one minute.
2. Add 4.00 ml of working reagent into a 12 × 75 mm plastic cuvette.
3. Cap and mix by inverting 10 times.
4. Incubate in a water bath at any convenient temperature ± 1°C, which temperature should lie between 20°C and 30°C, for 10 minutes.
5. Read in fluorometer and calculate from standard curve prepared by obtaining fluorescence units of standards containing known amounts of calcium by substituting standards for serum in the above procedure.

While the above methods are illustrative, it will be appreciated by one skilled in the art that the concepts will be essentially the same using other dyes. Other salts of molybdate, particularly those formed by the reaction of molybdate with monovalent cations such as ammonium, may be used in which the molar concentration of molybdate in the acid reagent is substantially as described in the embodiment set forth. The amount of sodium hydroxide must be such that it titrates the acid used in the first step and gives the final pH which is usually used with the particular dye.

The molybdate, or the molybdate and polyvinylpyrrolidone, may be dried preliminarily in the tube, thus achieving greater stability of the molybdic acid reagent. In performing the test with a tube so prepared, 1 ml 2N $H_2SO_4$ is added.

SUMMARY

As the amount of molybdate used to prepare the molybdic acid reagent is increased, a greater risk of false color from phosphorus in the serum is incurred.

As the amount of molybdate used to prepare the molybdic acid reagent is decresed, a greater risk of depressed values due to phosphate interference is incurred.

Thus, the concentration of the molybdate in the reagent mixture desirably is in the range of that shown in the illustrative embodiments, which is shown by molarity calculations to be about 0.41 micromoles of molybdate ion per microgram of calcium in the specimen, considering the well-known fact that the average calcium level in serum is about 10.0 mg per 100 ml of serum.

SUMMARY

An assay according to invention thus achieves the desired calcium-content determination without the interference of phosphorus, an element normally present in varying amounts in blood serum and urine and one which otherwise interferes with the colorimetric or fluorometric determination of calcium, as hereinabove discussed.

Accordingly, it will thus be seen from the foregoing description of the invention as set forth herein, that the present invention provides a new and useful assay yielding a colorimetric or fluorometric determination of serum calcium, and reagents therefor, having desired advantages and characteristics, and accomplishing the objects of the invention, including those hereinbefore pointed out and others which are inherent in the invention.

It will be understood that modifications and variations of the general and specific concepts of the overall assay may be effected without departing from the scope of the novel concepts of this invention; accordingly, the invention is not to be considered limited to the specific form or embodiments set forth herein for the purpose of disclosing and illustrating the inventive concepts.

NOTES

1. Clark, E.P., and Collip, J.P., "A Study of the Tisdall Method for the Determination of Blood Serum Calcium with a Suggested Modification," J. Biol. Chem. 36: 461–464 (1925); also ibid., 49:487 (1921).
2. Prifram, R., Berichte ueber die Verhandlungen der Koeniglich. Sachsische Gesellschaft der Wissenschaften zu Leipzig. Math.-phys. Classe, 1871 xxiii 279, as quoted in Kramer, B. and Tisdall, F.,J. Biol. Chem. 47: 475 (1921)
3. Searcy, R.L., Diagnostic Biochemistry, McGraw-Hill, N.Y., 1969, p. 135, 136.

4. Kramer, B., and Tisdall, F.F., "A Simple Technique for the Determination of Calcium and Magnesium in Small Amount of Serum," J.Biol.Chem. 47: 475–481 (1924)
5. Gradwohl, R.B.H., Clinical Laboratory Methods and Diagnosis, C.V. Mosby Company, St. Louis, 1943, Volume I, p. 279.
6. Kenny, A.D., and Toverud, S.U., "Noninterference of Phosphate in an Ethylenediaminetetrascetate Method for Serum Calcium," Anal. Chem. 26: 1059 (1954)
7. Connerty, H.V. and Briggs, A.R., Clinical Chemistry, 11: 716–728 (1965).
8. Burr, R.G., Clinical Chemistry, 15: 1191–1197.
9. Osmond, M.F. Bull. Soc. Chim. Paris 47:745 (1887), cited in Henry, R.J., Clinical Chemistry, Harper & Row, 1964, p. 414.
10. Fiske, C.H. and Subbarow, J. Biol. Chem. 66:375 (1925).
11. Denney, J.W., and Denney, L.W., U.S. Pat. No. 3,547,586, issued Dec. 15, 1970.

What is claimed is:

1. In a colorimetric or fluorometric quantitative determination of calcium level in a specimen of serum, in which the color or fluorescence is observed under alkaline conditions, the step of reacting the serum specimen in acid solution with about 0.41 micromoles of molybdate ion per microgram of calcium in the specimen, prior to the addition of a dye and alkali which is introduced to react with calcium in the forming of a colored or fluorescent complex, achieving, by the reaction of the molybdate with the phosphorus in the specimen, an elimination of the phosphorus effect in the specimen which otherwise would interfere with the colorimetric or fluorometric assay for calcium by complexing calcium of the specimen and thereby would cause an observational error by the rendering of that calcium unavailable to produce the reaction observed as indicative of calcium level by the assay.

2. The process as set forth in claim 1, in which polyvinylpyrrolidone is included in the acid solution to hasten the completion of the formation of the molybdophosphate complex.

3. The process as set forth in claim 1, in which the molybdate is added as a reagent prepared by mixing a molybdate salt, polyvinylpyrrolidone, and sulfuric acid.

4. The process as set forth in claim 1, in which the molybdate is added as a reagent prepared by mixing a molybdate salt with an acid.

5. The process as set forth in claim 4, in which the molybdate salt is one formed by the reaction of molybdate with a monovalent cation.

6. The process as set forth in claim 4, in which the molybdate salt is sodium molybdate.

7. The process as set forth in claim 4, in which the molybdate salt is ammonium molybdate.

8. The process as set forth in claim 4, in which polyvinylpyrrolidone is included in the acid solution to hasten the completion of the formation of the molybdophosphate complex.

* * * * *

UNITED STATES PATENT OFFICE
CERTIFICATE OF CORRECTION

Patent No. 3,771,961          Dated November 13, 1973

Inventor(s) Jerry W. Denney

It is certified that error appears in the above-identified patent and that said Letters Patent are hereby corrected as shown below:

Column 2, line 11, "if" should read -- is --. Column 3, line 19, "in" should read -- is --. Column 6, line 13, cancel "Summary"; line 59, "36" should read -- 63 --. Column 7, line 4, "1924" should read -- 1921 --.

Signed and sealed this 1st day of October 1974.

(SEAL)
Attest:

McCOY M. GIBSON JR.
Attesting Officer

C. MARSHALL DANN
Commissioner of Patents